3,412,884
BALE TRANSFER AND ARRANGING
MECHANISM
Raymond C. Fischer, Hinsdale, Ill., assignor to International Harvester Company, Chicago, Ill., a corporation of Delaware
Filed Oct. 26, 1966, Ser. No. 589,554
7 Claims. (Cl. 214—518)

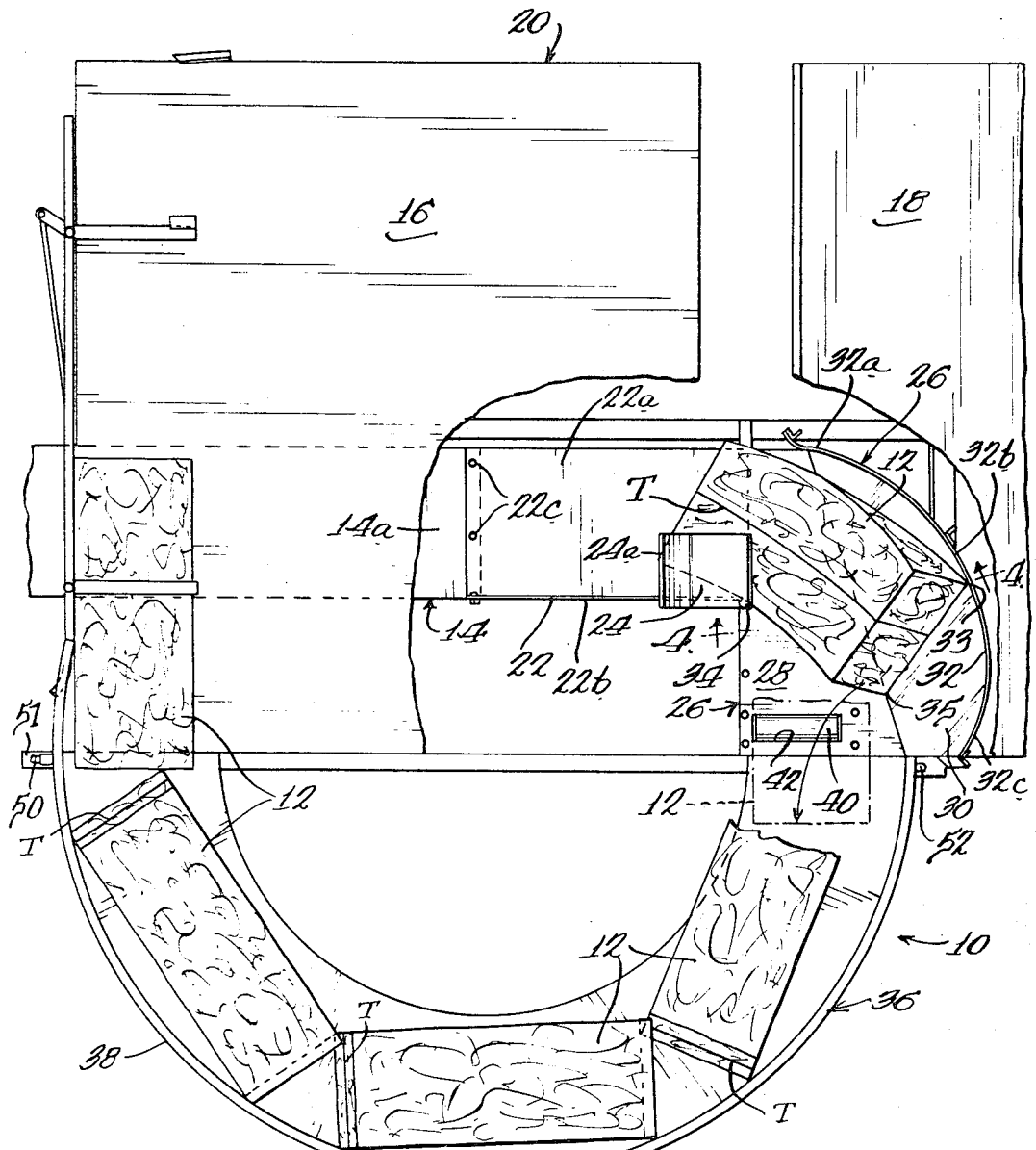

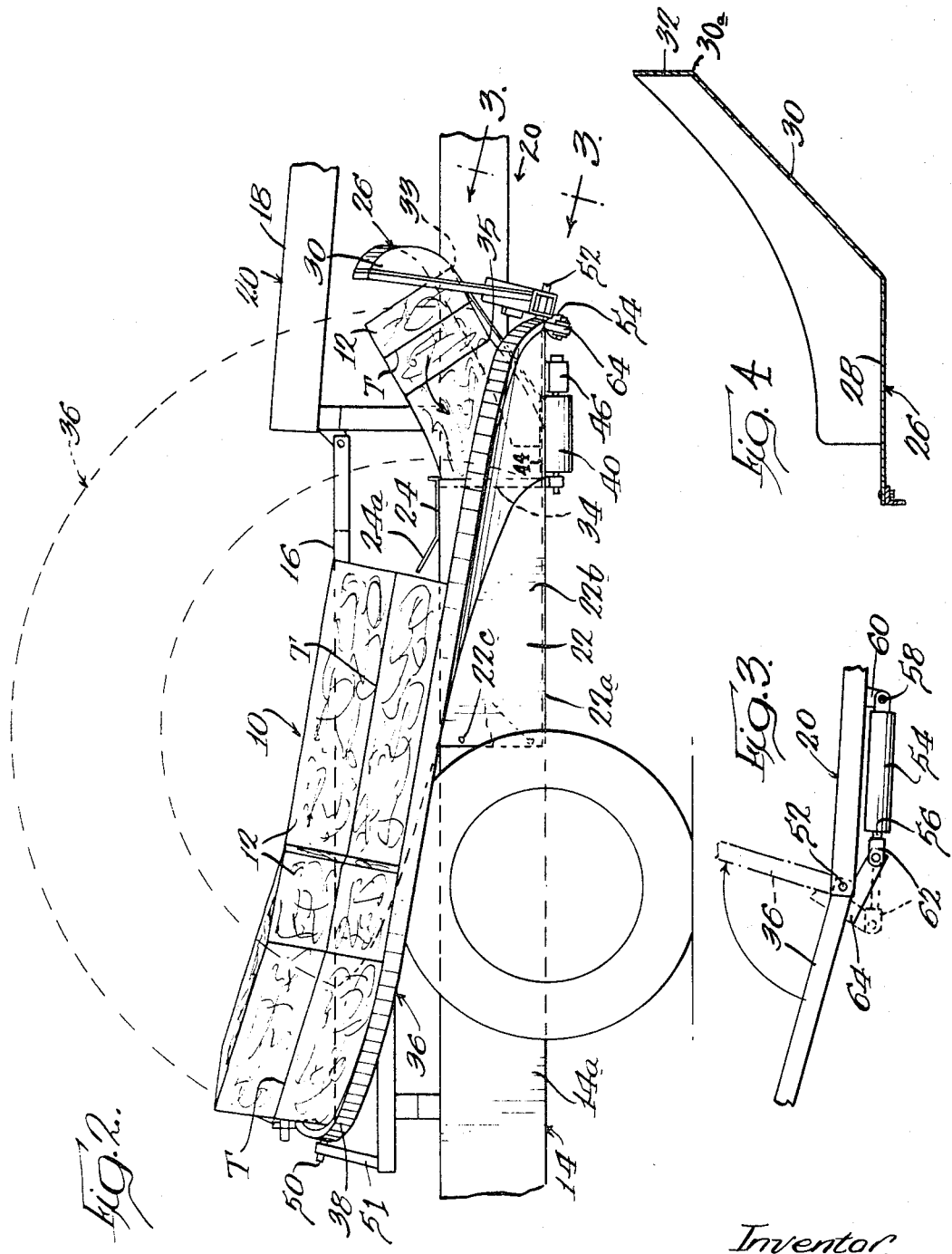

ABSTRACT OF THE DISCLOSURE

A bale transfer mechanism for use in combination with a baler, and comprising guide means situated adjacent the baler discharge and operative upon a bale received thereon to turn it 90° about its longitudinal axis, and a spiral ramp for directing the turned bales from the guide means to an associated platform elevationally and longitudinally displaced from the baler discharge.

---

This invention relates to agricultural equipment and more particularly to bale handling equipment for guiding and directing a bale of hay from the chamber of a hay baler to a temporary storage and arranging area displaced from the bale chamber.

Typically hay baler mechanisms gather hay, compact the hay into bundles and tie the bundles into a bale, depositing the completed bale out of the rear of the hay baler, in most instances along the field where the hay has been collected. This requires another pass through the field with other mechanism to pick up the bales and arrange the bales in the desired location and in the desired fashion. Recently new equipment has been provided for arranging bales received from a hay baler on a platform for transfer to a load carrying platform from which the bales may be dumped into a stack at a location remote from the original collection of the hay and formation of the bales. This arranging and temporary platform equipment is intended for use in conjunction with the hay baler. However, a need has arisen to provide a means for getting the bales of hay from the exit end of the baling chamber to the platform where the bales are arranged for disposition on the platform for temporary transit.

This invention is directed to the provision of a bale transfer mechanism for connection to the rear of a hay baler for receiving a bale of hay from the baler, changing the direction of travel and orientation of the bale, and transporting the same to a surface elevationally displaced from the bale chamber of the hay baler.

It is a primary object of this invention to provide a novel bale transfer mechanism.

It is another object of this invention to provide a new bale transfer mechanism which is connectable to the rear of conventional baler mechanism for receiving a bale of hay from the baler, changing the direction of travel and orientation of the bale and transporting the bale to a supporting surface which is elevationally displaced from the baling chamber.

It is another object of this invention to provide a new bale transfer mechanism where the bale is turned upon itself so that the tying swine which is used to bind the bale will not be in contact with the ground when the bale is ultimately stacked after removal of the bale from the arranging platform.

Other objects, features and advantages of the present invention will be apparent from the following description of the preferred embodiments illustrated in the accompanying drawings, in which:

FIGURE 1 is a fragmentary top plan view of the bale transfer mechanism of this invention;

FIGURE 2 is a fragmentary side elevational view of the bale transfer mechanism of this invention;

FIGURE 3 is a fragmentary enlarged view of a portion of the bale transfer mechanism moving means; and FIGURE 4 is an enlarged view of the bale tilting ramp.

Referring now to the drawings, the transfer mechanism 10 of this invention is intended for use in transferring bales 12 from the rear of a hay baler 14, and particularly the bale exit chamber 14a thereof, to an arranging platform 16 where the bales are arranged for subsequent transfer to another surface such as a hauling platform 18. The arranging platform 16 and hauling platform 18 are portions of a towed vehicular structure 20 which may be connected generally in tandem with the baler 14 for towage by the baler prime mover such as a tractor (not shown). It is, of course, possible that the prime mover, baler and transfer mechanism be constructed as a single unit to eliminate any tracking problems which might arise with a towed structure.

Bale transfer mechanism 10 includes a bale chamber extension 22 for receiving bales from the chamber 14a of baler 14 as the bales are processionally advanced out the rear thereof while the baler is moved through a field and continuously produces bales of hay. The bale chamber extension 22 includes a bottom panel 22a of sheet metal or the like providing a generally horizontal supporting surface for the bale and a side panel 22b also of sheet metal or the like which extends uprightly from the one side of the bottom panel. Both the bottom and side panels may directly mechanically be secured to the bale chamber by suitable fastening means 22c, it being understood that the relative size and shape of the chamber extension 22 may be made to conform to the general configuration of the bale chamber 14a. A bale hold-down member 24 is secured to the top of side panel 22b near the rear or free end thereof so as to generally overhang the bottom panel 22a. Hold-down 24 preferably is provided with an upwardly inclined end 24a facing the open end of bale chamber 14a and provides a means for retaining bales against bottom panel 22a in the rearward area of the bale chamber extension 22.

Rearwardly a bale chamber extension 22, a means is provided for changing the body orientation of the bales as well as the direction of travel of the bales. Included in this means is a member 26 of sheet metal or the like which has a first generally horizontal portion 28 substantially coplanar with the bottom panel 22a of the bale chamber extension, and a second bale tilting or inclined portion 30 which is inclined upwardly relative to horizontal portion 28 and terminates in an arcuate edge 30a.

Extending uprightly from arcuate edge 30a is an arcuate wall 32 which extends from a point 32a closely adjacent horizontal portion 28 to a medial peak 32b and curves upwardly to the rearward end 32c, providing a flange or barrier against which the leading corner of the bale is guided for turning and upsetting the bale relative to its original orientation.

When the bale is pushed outwardly from the chamber 14a and continues in its path of travel towards the member 26, a corner, hereinafter referred to as the leading corner 33, engages the member 32 at its rear end 32a. Continued movement of the bale as it is forced forwardly by the next advancing bale causes the leading corner to be tilted upwardly along the inclined portion 30 while the body of the bale is pivoted about a post 34 at the rear or free edge of side wall 22b. Further progression of the bale causes further pivoting around the point 34 and, as the bale reaches a point where the other forward lower corner 35 generally occupies the juncture between horizontal portion 28 and inclined portion 30, the bale is caused to be upset relative to itself to thereby bodily rotate the bale 90° about its own axis. This occurs about the time that the bale is also rotated 90° relative to its direction of travel. This rotation of the bale about its own axis is desired so that the twine T which is wrapped around the bale to hold it in a bundle will not be in contact with the ground when the bale is ultimately placed in a stack after being removed from the vehicle upon which the arranging platform and hauling platform are located.

Located in the path of bale travel adjacent the means for changing the body orientation and direction of bale travel is a means for changing the elevation and further changing the direction of travel of the bale. Included in this means is a ramp 36 which is generally semi-circular in plan and helical segmental in elevation. Ramp 36 extends from the horizontal portion of member 26 on one level to the platform 16 which is elevationally displaced from member 26, the bottom panel 22a of bale chamber extension 22 and the bale chamber 14a itself. Ramp 36 has an upstanding flange or rail 38 along the outer arcuate edge thereof, with which leading edges of the bales are continually in engagement as they are pushed upwardly and around the length of ramp 36, causing the bales to continually follow the path of the ramp to change the direction of travel of the bales approximately 180°.

A means is provided for propelling the bales upwardly along the ramp. In the illustrated embodiment, this means takes the form of a powered roller 40 which is positioned in the path of bale travel, preferably near the exit end of horizontal portion 28 of member 26. A slot 42 is provided in member 26 adjacent the ramp 36 to permit a portion of the periphery 44 of the roller 40 to protrude therethrough. A motor 46 is provided for driving the roller. Preferably the periphery of the roller has a relatively high coefficient of friction with the bales of hay to insure good driving contact therewith as the bales are fed over the area of the roller.

Ramp 36 is connected to the body of the vehicle by means for permitting the ramp to be moved between a bale transfer position, wherein the ramp is positioned laterally outwardly from the side of the vehicle, and a retracted position, wherein the ramp is folded upwardly adjacent the body of the vehicle, permitting the vehicle to be easily transported between fields, along access roads and the like. Included in this means for connecting the ramp is a pivot pin 50 which extends outwardly from the upper end of rail 38 and is pivotally journalled in a brace 51 which is secured to the arranging platform 16. At the lower end of ramp 36, a pivot pin 52 extends outwardly from rail 38 and is rotatably journalled in the body of the vehicle 20.

A means is provided for moving the ramp between the aforementioned extended and retracted positions including a piston and cylinder device 54 having a linearly extensible rod 56. The cylinder 54 is pivoted at one end 58 to a bracket 60 which depends from the body of the vehicle 20 and at the other end the rod is provided with an end adapter 62 which is pivoted to a bracket 64 secured to the underside of ramp 36 forwardly of pivot pin 52. As the piston and cylinder device is provided with fluid under pressure, rod 56 will move linearly with respect to the cylinder causing pivotal movement of the ramp 36 about the pins 52 and 50. When the rod moves outwardly, the ramp will be folded upwardly and moved towards the retracted position adjacent the vehicle. Conversely, when the rod is retracted inwardly relative to the cylinders, the ramp will be pulled outwardly to the spread operating position laterally adjacent the side of the vehicle, in which position bales may be urged in a path of travel from the member 26 up to the arranging platform 16.

With this invention, bales of hay may be transferred from the bale chamber of a hay baler to an arranging platform on a vehicle which is towed in tandem with the hay baler even though the arranging platform is elevationally displaced from the baling chamber and even though the area of reception of the bales on the arranging platform is directionally displaced from the point of exit of the baling chamber. This permits portions of the towed vehicle upon which the arranging platform is found to be juxtaposed over portions of the baler to reduce the overall length of the tandem train of agricultural equipment which is towed by the prime mover. In addition, the bale transfer mechanism of this invention provides means for rotating the bale bodily on its axis so that the sides of the bale around which the twine passes will be free of contact with the bale supporting surface during both transport of the bale to the arranging platform and subsequent stacking of the bale as it is taken from the arranging platform.

The foregoing detailed description has been given for clearness of understanding only, and no unnecessary limitations should be understood therefrom, as some modifications may be obvious to those skilled in the art.

I claim:

1. For use in an attached vehicle for receiving bales fed outwardly from the bale chamber of a hay baler and arranging the bales on a platform elevationally displaced from the bale chamber, a bale transfer mechanism comprising:

a bale chamber extension means for receiving bales fed outwardly from said chamber;

turning means adjacent said extension means for changing the direction of travel of said bales, said turning means including a surface extending across the path of bale travel and positioned to engage at least a portion of the bale to turn the same and change its direction of travel responsive to progressive movement of the bale; and ramp means extending between said turning means and the elevationally displaced arranging platform, said ramp means extending laterally outwardly from the turning means and returning theretoward at a point elevationally spaced therefrom, said ramp means also defining a surface extending generally across the path of bale travel in a position to engage at least a portion of the bale to elevationally displace and change the direction of travel of the bale and thereby feed the bale to the arranging platform for subsequent withdrawal therefrom.

2. For use in an attached vehicle for receiving bales fed outwardly from the bale chamber of a hay baler and arranging the bales on a platform elevationally displaced from the bale chamber, a bale transfer mechanism comprising: a bale chamber extension means for receiving bales fed outwardly from said chamber; turning means adjacent said extension means for changing the direction of travel of said bales, said turning means including a surface extending across the path of bale travel and positioned to engage at least a portion of the bale to turn the same and change its direction of travel responsive to progressive movement of the bale and means for turning the bale about its longitudinal axis 90° so as to change the plane in which the twine wrapped around the bale is disposed; and ramp means extending between said turning means and the elevationally displaced arranging platform, said ramp means also defining a surface extending generally across the path of bale travel in a position to engage at least a portion of the bale to elevationally displace and change the direction of travel of the bale and thereby feed the bale to the arranging platform for subsequent withdrawal therefrom.

3. The bale transfer mechanism of claim 1 wherein the ramp means is pivoted to the towed vehicle at its opposite ends for movement between a collapsed position adjacent the vehicle and an extended operational position for transferring bales from the turning means to the elevationally displaced arranging platform.

4. The bale transfer mechanism of claim 2 wherein the turning means includes a first surface generally coplanar with the lower surface of the bale chamber and bale chamber extension and a second surface inclined upwardly relative to the first surface and extending generally across the path of bale travel.

5. The bale transfer mechanism of claim 4 wherein a third surface is provided on the inclined surface projecting generally uprightly relative thereto for contacting the leading corner of a bale fed outwardly from the bale chamber and tilted upwardly on the inclined surface to turn and axially rotate the bale relative to its original orientation and path of travel.

6. The bale transfer mechanism of claim 5 including means near the exit end of the turning means for propelling bales outwardly therefrom.

7. The bale transfer mechanism of claim 6 wherein the bale chamber extension means includes a bottom generally coplanar with the bottom of the bale chamber of the hay baler and a closed side and an open side, the open side generally in alignment with a trailing end of the third surface of the turning means so that as bales are fed outwardly from the bale chamber towards the turning means, the leading corner of the bales abut the third surface and pivot about the free end of the closed side, continued progression of the bales causing the bales to be tilted and tipped about their axes responsive to further engagement of the leading corner of the bale with the inclined surface and third upright surface of the turning means and the opposite side of the bale with the leading edge of the closed side of the bale chamber extension.

References Cited

UNITED STATES PATENTS

| | | |
|---|---|---|
| 2,518,606 | 8/1950 | Eicher. |
| 2,551,427 | 5/1951 | Ellefson _____ 198—7 |
| 2,918,162 | 12/1959 | Ervin _____ 198—7 XR |

ALBERT J. MAKAY, *Primary Examiner.*